UNITED STATES PATENT OFFICE.

GEORGE M. HARRISON, OF NEW ORLEANS, LOUISIANA, ASSIGNOR TO A. A. MAGINNIS' SONS, OF SAME PLACE.

IMPROVEMENT IN SOAPS AND PROCESSES FOR MANUFACTURING THE SAME.

Specification forming part of Letters Patent No. 175,976, dated April 11, 1876; application filed December 9, 1875.

*To all whom it may concern:*

Be it known that I, GEORGE M. HARRISON, a resident of the city of New Orleans and State of Louisiana, have invented a certain new and useful Improvement in Mottled Cotton-Seed-Oil Soap; and I do hereby declare the following to be a full, clear, and correct description of the same.

To prepare the mottled soap, take of crude cotton-seed oil, say, five hundred pounds, to which add about one hundred and twenty pounds caustic alkali, one hundred and thirty pounds water, fifty pounds of rosin, and fifty pounds carbonate soda, and thoroughly agitate and mix the same in an ordinary steam-jacketed kettle for about one hour, after which the steam is applied and the whole mass heated to about 120° Fahrenheit. Let it stand to settle, say, about twenty-four hours, then skim or draw off the top, which is of a comparatively light color, into another similarly-constructed kettle, and boil each separately.

The mottling is produced by mixing together the two shades of soap while in a melted state, with about fifteen pounds of turpentine and fifteen pounds of ammonia; then draw off into frames and let it stand to cool and harden for about four days, at the end of which time it is ready to be cut into bars.

This soap has superior cleansing qualities, and it can be used with equally good effect in either fresh or brackish water.

I am well aware that the mixing together of soaps of different colors and qualities for producing a mottled soap has long been known, hence do not broadly claim the same as my invention; but What I do claim as new, and desire to secure by Letters Patent, is—

1. A composition for soap consisting of the following ingredients: crude cotton-seed oil, caustic alkali, water, rosin, carbonate of soda, turpentine, and ammonia, substantially as described.

2. The process herein described, consisting in boiling together crude cotton-seed oil, caustic alkali, water, rosin, and carbonate of soda, then allowing the mass to settle, skimming off the niger and boiling separately, and finally mixing the two together and adding thereto turpentine and ammonia, as specified.

GEO. M. HARRISON.

Witnesses:
H. N. JENKINS,
T. J. ROACH.